(12) United States Patent
Lee

(10) Patent No.: US 7,530,585 B2
(45) Date of Patent: May 12, 2009

(54) REAR SUSPENSION STRUCTURE FOR LARGE VEHICLES

(75) Inventor: Kyong-Sup Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 421 days.

(21) Appl. No.: 11/304,920

(22) Filed: Dec. 14, 2005

(65) Prior Publication Data

US 2007/0090620 A1    Apr. 26, 2007

(30) Foreign Application Priority Data

Oct. 24, 2005  (KR)  ............. 10-2005-0100118

(51) Int. Cl.
*B60G 9/00* (2006.01)
*B60G 11/27* (2006.01)

(52) U.S. Cl. .................. 280/124.116; 280/124.157

(58) Field of Classification Search .......... 280/124.111, 280/124.116, 124.157, 124.16, 104, 124.162, 280/124.177
See application file for complete search history.

(56) References Cited

U.S. PATENT DOCUMENTS

| | | | | |
|---|---|---|---|---|
| 3,669,467 A | * | 6/1972 | Dunlap et al. | 280/124.116 |
| 4,379,572 A | * | 4/1983 | Hedenberg | 280/86.75 |
| 4,518,171 A | * | 5/1985 | Hedenberg | 280/6.159 |
| 4,557,501 A | * | 12/1985 | Farleigh | 280/124.111 |
| 4,733,876 A | * | 3/1988 | Heider et al. | 280/6.158 |
| 4,858,948 A | * | 8/1989 | Raidel | 280/124.116 |
| 4,923,210 A | * | 5/1990 | Heider et al. | 280/6.153 |
| 4,946,189 A | * | 8/1990 | Manning | 180/349 |
| 5,758,898 A | * | 6/1998 | Gordon et al. | 280/124.106 |

FOREIGN PATENT DOCUMENTS

| | | |
|---|---|---|
| CH | 381102 | 2/1960 |
| DE | 1046510 | 12/1958 |
| GB | 861049 | 2/1961 |
| JP | 59063213 | 4/1984 |
| JP | 7081361 | 3/1995 |
| JP | 07108808 A | 4/1995 |
| JP | 8230426 | 9/1996 |
| JP | 9024716 | 1/1997 |
| JP | 9024717 | 1/1997 |
| JP | 11157317 | 6/1999 |
| WO | WO 01/19627 | 3/2001 |

* cited by examiner

*Primary Examiner*—John Q. Nguyen
*Assistant Examiner*—George D. Spisich
(74) *Attorney, Agent, or Firm*—Morgan, Lewis & Bockius LLP

(57) ABSTRACT

A rear suspension structure for large vehicles increases durability of a bump stopper and an air spring, thus markedly enhancing the riding comfort and handling ability of a vehicle. Furthermore, the amount of air to be drawn into and discharged from the air spring is increased, so that stable handling ability of the vehicle is ensured, thus markedly enhancing traveling stability of the vehicle. As well, the present invention ensures the lateral rigidity of a rear axle and prevents deflection of the vehicle when traveling.

4 Claims, 5 Drawing Sheets

REAR SUSPENSION STRUCTURE FOR LARGE VEHICLES

CROSS-REFERENCE TO RELATED APPLICATIONS

The present application is based on, and claims priority from, Korean Application Serial Number 10-2005-0100118, filed on Oct. 24, 2005, the disclosure of which is hereby incorporated by reference herein in its entirety.

FIELD OF THE INVENTION

The present invention relates to suspension systems and, more particularly, to a rear suspension structure used for large vehicles.

BACKGROUND OF THE INVENTION

Generally, a rear suspension system for a large vehicle should serve to sufficiently support the weight of the vehicle and ensure a smooth comfortable ride. For this, the rear suspension system includes a plurality of air springs employing the compressive elasticity of air.

Furthermore, the rear suspension system further includes leveling valves which supply compressed air into the air springs and discharge compressed air from the air springs when the height of the vehicle varies due to changes in the weight of the vehicle, thus maintaining the constant height of the vehicle. The rear suspension system further includes an upper radius rod and a lower radius rod which serve to couple a rear axle housing to the vehicle body and support the rear axle housing against force applied in a forward-backward direction of the vehicle.

As such, the rear suspension system of the large vehicle which includes the air springs, the leveling valves, the upper radius rod and the lower radius rod, absorbs vibrations and impacts transferred from the road, thus enhancing the riding comfort of the vehicle. As well, the rear suspension system helps the vehicle have superior handling ability, thus enhancing the traveling stability of the vehicle.

SUMMARY OF THE INVENTION

Embodiments of the present invention provide a rear suspension structure for large vehicles which is provided with an air spring having an improved structure, thus further increasing the durability of the air spring, and in which the amount of air to be drawn into and discharged from the air spring increases thanks to a changed installation position of a leveling valve, thereby further enhancing the riding comfort of the vehicle and ensuring the stable handling ability of the vehicle.

Furthermore, the embodiments of the present invention provide a rear suspension structure for large vehicles which is provided with a lower radius rod having an improved shape and installation structure, so that lateral rigidity of a rear axle is increased, and a process of correcting misalignment of the rear axle can be performed more conveniently, thus preventing deflection of the vehicle when traveling, thereby enhancing the traveling stability of the vehicle.

A rear suspension structure for large vehicles according to an embodiment of the present invention includes a plurality of air springs. Each air spring includes an air chamber mounted to each of a rear center cross member and a rear end upper cross member, which are mounted to rear body side frames in directions crossing the rear body side frames, through an upper plate, and a piston sealing a lower end of the air chamber and mounted on each of opposite ends of rear axle support beams through a lower plate. A pair of bump stoppers is mounted to the respective rear body side frames at positions right above the rear axle housing. A leveling valve is placed in each of an axis that connects centers of the two left air springs that are disposed at front and rear positions based on the rear axle housing, and an axis that connects centers of the two right air springs that are disposed at front and rear positions based on the rear axle housing. A lower radius rod is coupled at a first end thereof to each of the rear axle support beams by a bushing pipe passing vertically through the lower radius rod and is coupled at a second end thereof to a rear end lower cross member by a member bracket and a bushing pipe passing horizontally through the lower radius rod.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
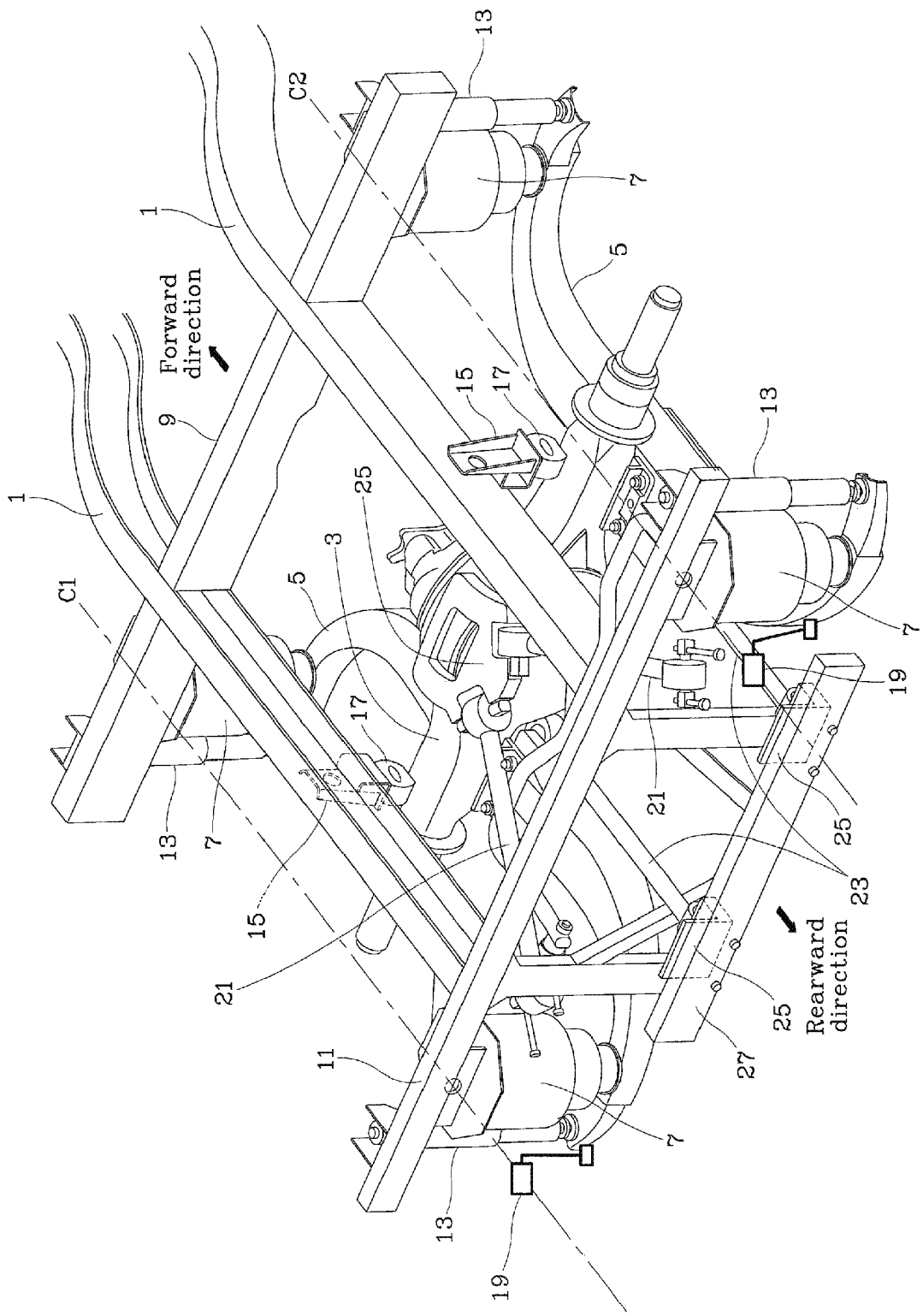
FIG. 1 is a perspective view of a rear suspension system for large vehicles, according to an exemplary embodiment of the present invention.

As shown in FIG. 1, in a rear suspension system for large vehicles according to the preferred embodiment of the present invention, a rear axle support beam 5 is mounted at a medial portion thereof to each of opposite ends of a rear axle housing 3, which crosses rear body side frames 1 in a lateral direction of a vehicle.

Four air springs 7 are mounted on respective ends of the rear axle support beams 5. Each of the two left and right air springs 7, which are disposed to the front of the rear axle housing 3, is fastened at an upper end thereof to a rear center cross member 9. Each of the two remaining left and right air springs 7, which are disposed towards the rear of the vehicle, is fastened at an upper end thereof to a rear end upper cross member 11.

Furthermore, a shock absorber 13 is provided on a sidewall of each air spring 7. Upper and lower ends of the shock absorbers 13 are fastened to the rear center cross member 9, the rear end upper cross member 11 and the rear axle support beam 5 in the same manner as are the four air springs 7.

Figure 2:
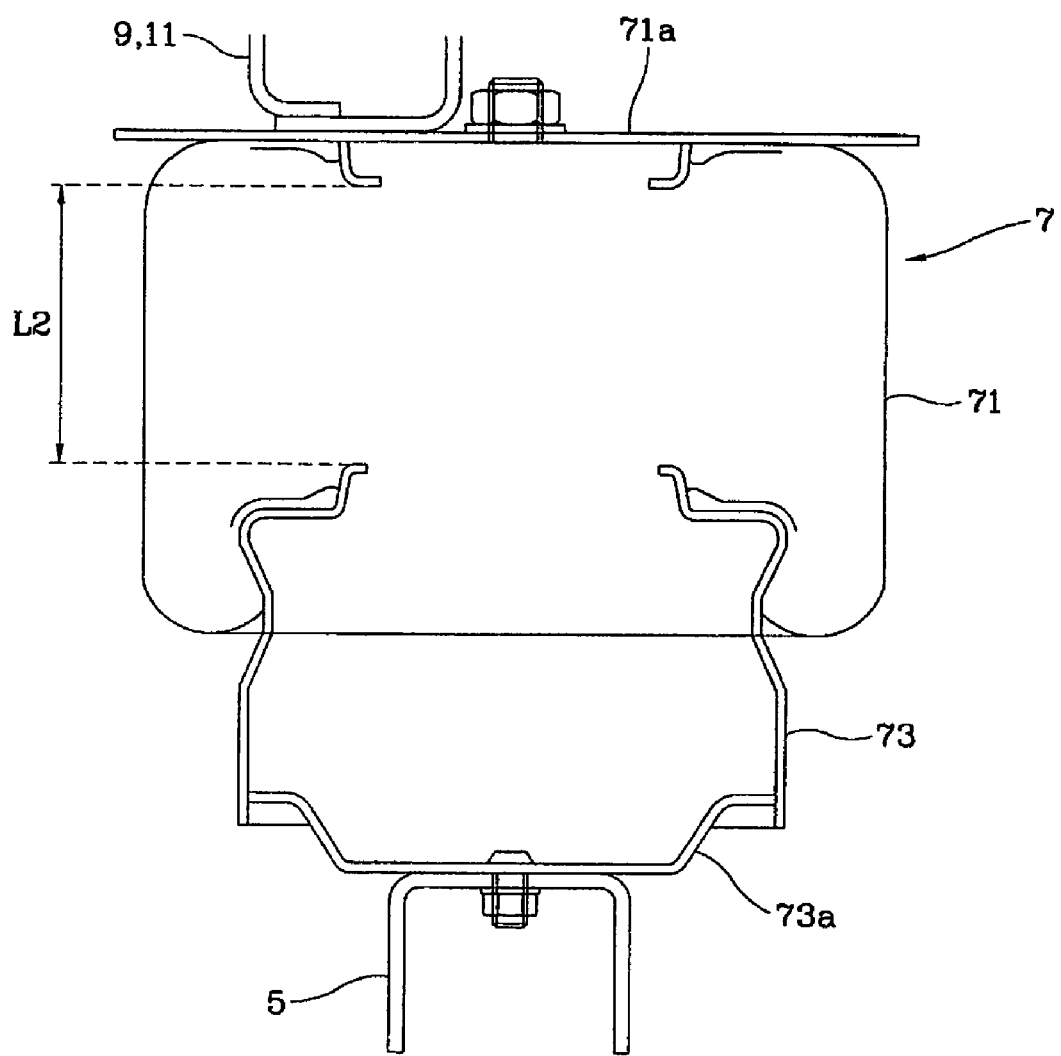
FIG. 2 is a sectional view of an air spring of the rear suspension system of FIG. 1.

As shown in FIG. 2, each air spring 7 includes an air chamber 71 which has a bellows shape, and a piston 73 which contracts the air chamber 71.

Of the air chambers 71, each of two left and right air chambers 71, which are disposed at front positions based on the rear axle housing 3, is mounted at an upper end thereof to the rear center cross member 9 through an upper plate 71a. Each of two remaining left and right air chambers 71, which are disposed to the rear of the rear axle housing 3, is mounted at an upper end thereof to the rear end upper cross member 11 through an upper plate 71a.

The piston 73 overlaps at an upper end thereof a lower end of the air chamber 71 such that the upper end of the piston 73 seals the lower end of the air chamber 71. The piston 73 is mounted at a lower end thereof to the rear axle support beam 5 through a lower plate 73a.

Figure 3:
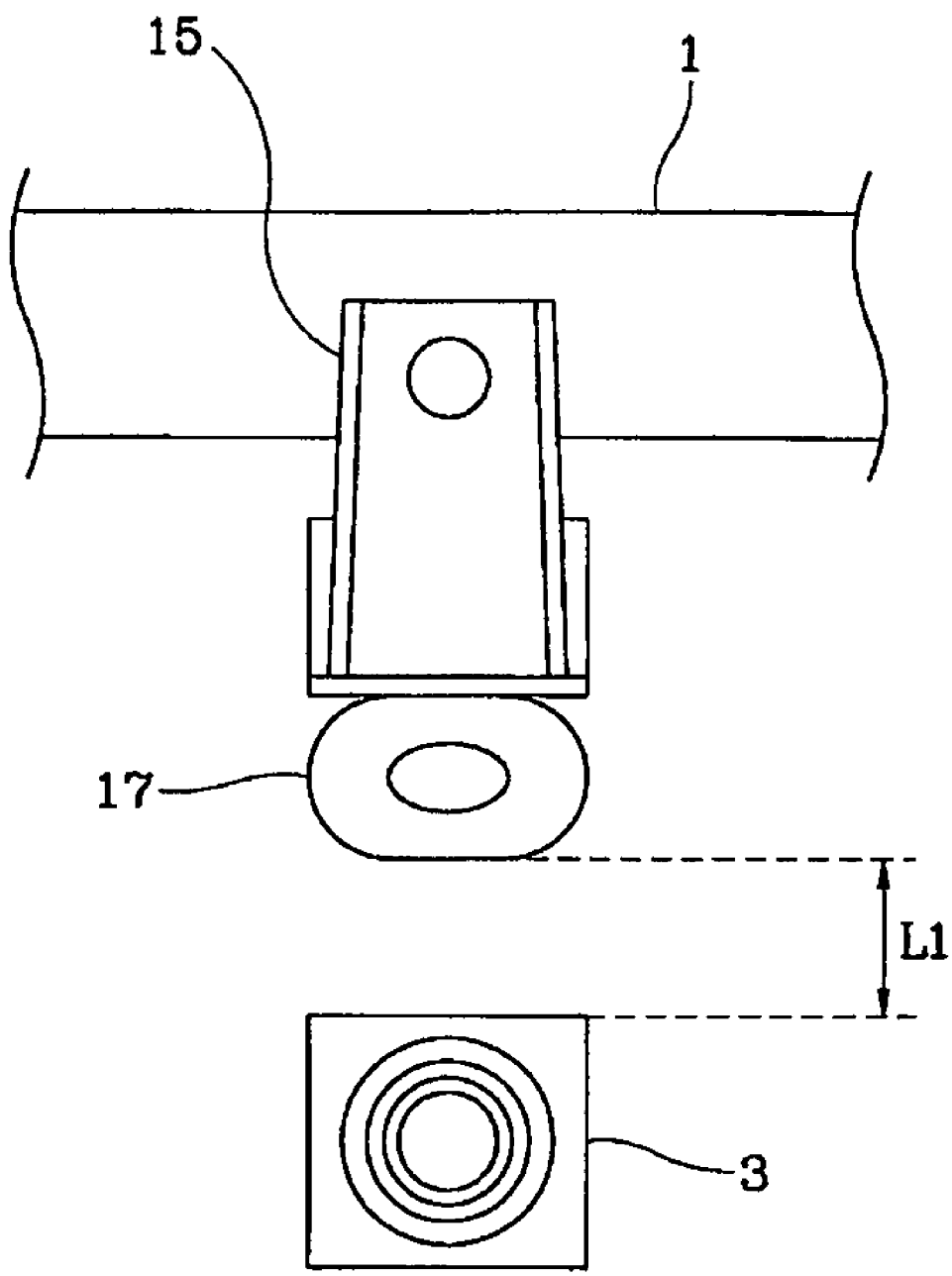
FIG. 3 is a side view illustrating a bump stopper of the rear suspension system of FIG. 1.

As shown in FIGS. 1 and 3, a stopper bracket 15 is fastened at an upper end thereof to each rear body side frame 1 at a position immediately above the rear axle housing 3. A bump stopper 17 is bonded to a lower end of each stopper bracket 15 through a vulcanization process.

Here, the bump stopper 17 is installed such that a lower end thereof does not contact the rear axle housing 3 when no outside force is applied. In other words, the bump stopper 17 is spaced apart from the upper surface of the rear axle housing 3 in a vertical direction by a predetermined distance.

Furthermore, the rear suspension system is constructed such that the distance (L1) between the rear axle housing 3 and the bump stopper 17 is shorter than the distance (L2) between an inside upper end of the air chamber 71 and the upper end of the piston 73, as shown in FIGS. 2 and 3.

Figure 4:
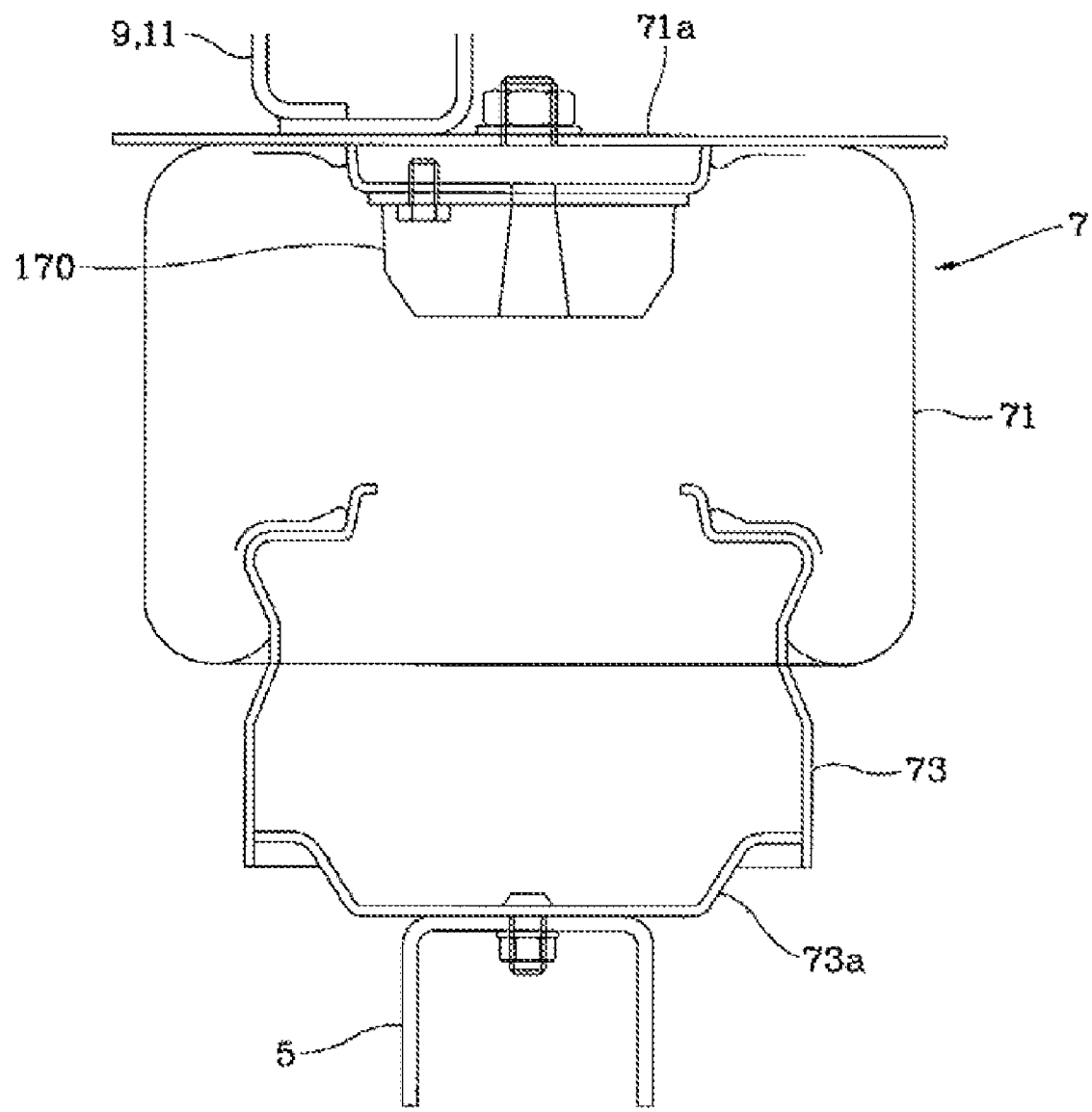
FIG. 4 is a sectional view corresponding to FIG. 2, but showing a conventional air spring.

Meanwhile, in the present invention, the bump stopper 17, mounted to the rear body side frame 1 through the stopper bracket 15, is separated from the air spring 7. However, a conventional stopper bracket 170 is mounted to an upper end in an air chamber 71, constituting an air spring 7, by a locking bolt, and faces a piston 73 in the air chamber 71, as shown in FIG. 4.

Therefore, in a conventional rear suspension system, absorption of vibration and impact is first performed by the compressive elasticity of air in the air spring 7 and, thereafter, is performed by the bump stopper 170. However, in the rear suspension system of the present invention, after the action of the bump stopper 17 is first performed, the elastic air compressing action of the air spring 7 is performed.

As shown in FIG. 1, the rear suspension system of the present invention further includes leveling valves 19 which supply compressed air into the air springs 7 or discharge compressed air from the air springs 7 when the height of the vehicle varies due to a change in the weight of the vehicle, thus maintaining the constant height of the vehicle.

According to the structure of the present invention, the leveling valves 19 are placed in a central axis (C1), which connects the centers of the two left air springs 7 that are disposed at front and rear positions based on the rear axle housing 3, and in a central axis (C2), which connects the centers of the two right air springs 7.

Furthermore, as shown in FIG. 1, the rear suspension system of the present invention further includes upper radius rods 21 and lower radius rods 23 which serve to couple the rear axle housing 3 to the vehicle body and support the rear axle housing 3 against force applied in a forward-backward direction of the vehicle.

Each upper radius rod 21 is coupled to a housing bracket 25 by a bushing pipe (not shown) provided on a first end of the upper radius rod 21. The housing bracket 25 is mounted at an upper position to a medial portion of the rear axle housing 3.

Furthermore, the upper radius rod 21 is coupled to a bracket (not shown), mounted to the rear end upper cross member 11, by a bushing pipe (not shown) provided on a second end of the upper radius rod 21.

Therefore, the upper radius rods 21 serve to couple the rear axle housing 3 to the vehicle body.

Figure 5:
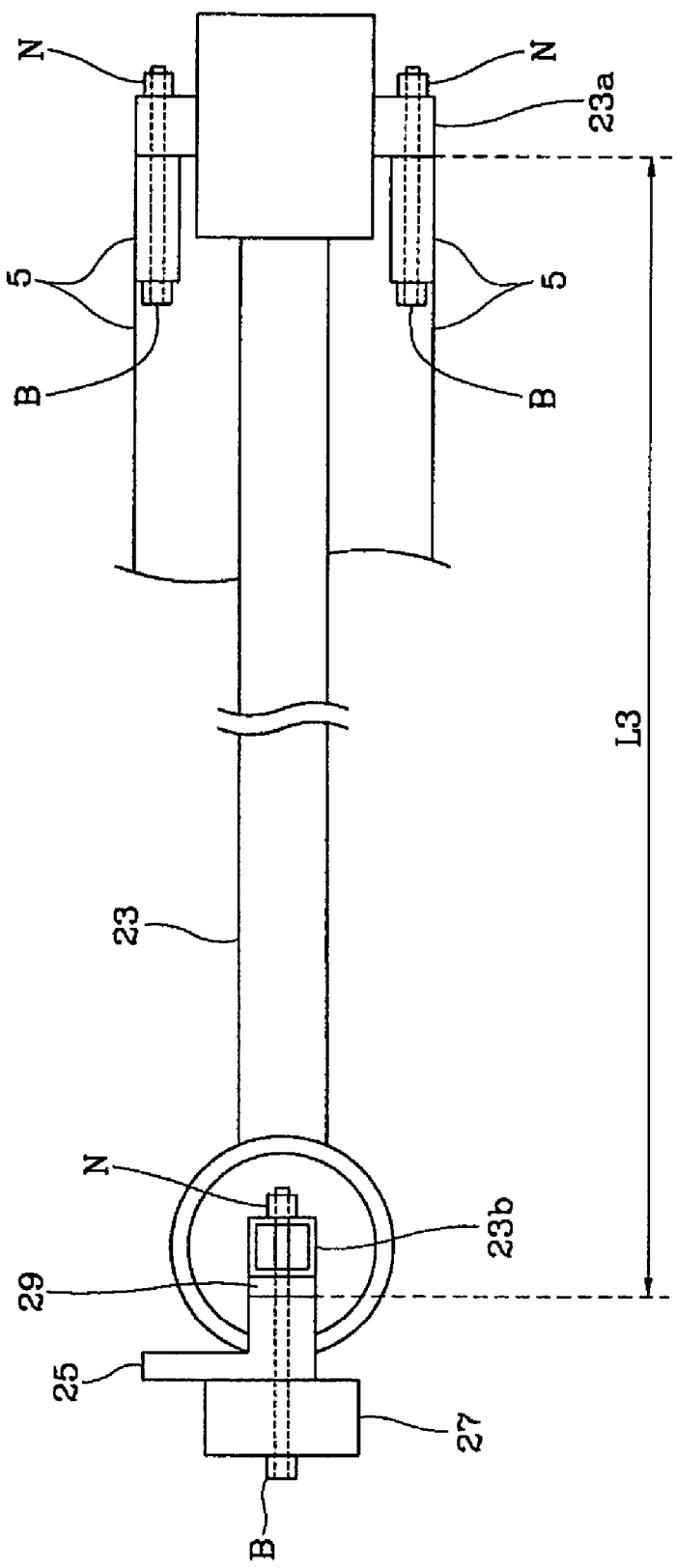
FIG. 5 is a view illustrating an installation structure of a lower radius rod of the rear suspension system of FIG. 1.

As shown in FIGS. 1 and 5, each lower radius rod 23 is coupled at a first end thereof to each rear axle support beam 5 by a bushing pipe 23a, which vertically passes through the first end of the lower radius rod. The lower radius rod 23 is coupled at a second end thereof to a rear end lower cross member 27 by a member bracket 25 and a bushing pipe 23b, which horizontally passes through the second end of the lower radius rod 23.

Therefore, the lower radius rods 23 serve to couple the rear axle housing 3 to the vehicle body along with the upper radius rods 21.

The rear end lower cross member 27 is a construction of the vehicle body which is provided below and is parallel to the rear end upper cross member 11.

In FIG. 5, the reference character B denotes a locking bolt, and the reference character N denotes a nut.

Meanwhile, each lower radius rod 23 has a structure such that the overall length (L3) thereof can be adjusted. As shown in FIG. 5, the overall length (L3) of the lower radius rod 23 can be adjusted by varying the thickness of a shim 29 interposed between the member bracket 25 and the bushing pipe 23b.

Here, the overall length (L3) of the lower radius rod 23 means the length from an end of the member bracket 25 which contacts the shim 29 to a junction between the rear axle support beam 5 and the bush pipe 23a.

The operation and effect of the rear suspension system of the present invention will be described herein below.

If vibration and impact are transmitted to the vehicle from the road when the vehicle travels, the bump stoppers 17 first absorb the vibration and impact while contacting the rear axle housing 3. Consecutively, the air springs 7 absorb the vibration and the impact using their elastic air compression functions.

Because each bump stopper 17 is spaced apart from the rear axle housing 3 by the predetermined length (L1), when the bump stopper 17 is brought into contact with the rear axle housing 3, less impact is applied to the bump stopper 17. Therefore, the amount of variation in shape of the bump stopper 17 is also reduced.

As a result, damage to the bump stopper 17 is minimized, so that durability and lift time of the bump stopper 17 are increased.

Furthermore, the present invention has a structure such that the bump stoppers 17 are disposed outside of the air springs 7. Consequently, a user can easily observe the degree of damage to the bump stoppers 17 with the naked eyes. If damage to the bump stopper 17 is severe, the damaged bump stopper 17 can be easily replaced with a new one without replacing the air springs 7.

Comparatively, in the conventional art of FIG. 4, because the bump stopper 170 is provided in the air chamber 71 constituting the air spring 7, the user cannot observe the degree of damage to the bump stopper 170 with the naked eyes. As well, it is disadvantageous in that, when replacement of the damaged bump stopper 170 with a new one is desired, the user must disassemble the air spring 7 before replacing the bump stopper 170 with a new one.

As such, compared to the conventional art, the present invention has an advantage of increased durability of the bump stopper 17 and the air spring 7.

Furthermore, as damage to the bump stopper 17 is reduced, ability to absorb vibrations and impacts transferred from the road is enhanced, thus increasing the riding comfort and handling ability of the vehicle.

As well, in the present invention, the leveling valves 19 are placed in the central axes (C1 and C2) that connect the air springs 7 disposed at front and rear positions. Therefore, the amount of air to be drawn into and discharged from the air springs 7 is markedly increased, thus ensuring improved riding comfort and stable handling ability of the vehicle, and markedly enhancing stability of the vehicle when traveling.

In addition, each lower radius rod 23 is coupled at the first end thereof to the rear axle support beam 5 by the bushing pipe 23a which vertically passes through the first end of the lower radius rod 23. Thus, the opposite ends of the bushing pipe 23a face upward and downward directions of the vehicle, and the circumferential outer surface thereof faces a horizontal direction of the vehicle. Therefore, the lateral rigidity of the rear axle is markedly enhanced.

Moreover, the lower radius rod 23 has a structure such that the overall length (L3) thereof can be adjusted by varying the thickness of the shim 29 interposed between the member bracket 25 and the bushing pipe 23b. Consequently, even if a left or right end of the rear axle becomes misaligned with the opposite end of thereof in a forward or backward direction, the work of correcting it can be easily performed by aligning the opposite ends of the rear axle with each other using the shim 29.

Therefore, the alignment of the rear axle prevents deflection of the vehicle when traveling, thus markedly enhancing the traveling stability of the vehicle.

As is apparent from the foregoing, the present invention provides a rear suspension system for large vehicles which increases the durability of a bump stopper and an air spring, thus markedly enhancing the riding comfort and handling ability of a vehicle. Furthermore, the amount of air to be drawn into and discharged from the air spring is increased, so that stable handling ability of the vehicle is ensured, thus markedly enhancing traveling stability of the vehicle. As well, the present invention ensures the lateral rigidity of a rear axle and prevents deflection of the vehicle when traveling.

What is claimed is:

1. A rear suspension structure for a vehicle, comprising:
a plurality of left air springs being disposed in front and behind an axle housing in a left side of the axle housing and a plurality of right air springs being disposed in front and behind the axle housing in a right side of the axle housing in a longitudinal direction of the vehicle, wherein one end of each left air spring is coupled to a left rear axle support beam positioned below the axle housing and one end of each right air spring is coupled to a right rear axle support beam below the axle housing, each left and right air spring comprising:
an air chamber; and
a piston sealing a lower end of the air chamber;
leveling valves, one of which being connected with the left air springs and another of which being connected with the right air springs, wherein the leveling valve of the left springs being arranged on a plane connecting vertical center axes of the left air springs and the leveling valve of the right air springs being arranged on a plane connecting vertical center axes of the right air springs;
a pair of bump stoppers respectively attached to rear body side frames directly above the axle housing at a predetermined distance, wherein the rear body side frames are aligned in the longitudinal direction of the vehicle and the axle housing is positioned between the rear body side frames;
a lower radius rod respectively coupled at a first end thereof to one of the left or right rear axle support beams by a bushing pipe passing vertically through the lower radius rod and coupled at a second end thereof to a rear end lower cross member by a member bracket and a bushing pipe passing horizontally through the lower radius rod,
wherein the other ends of at least one of the left air springs and at least one of the right air springs are attached to a rear center cross member by an upper plate, the other ends of at least one of the left air springs and at least one of the right air springs are attached to the rear end upper cross member by an upper plate, and the pistons of the left and right air springs are respectively attached to opposite ends of the left and right rear axle support beams by a lower plate, and
wherein the rear center cross member is positioned above the axle housing, and transversally attached to the rear body side frames, and the rear end upper cross member is positioned above the axle housing and transversally attached to the rear body side frames.

2. The rear suspension structure as defined in claim 1, wherein the bumper stopper is bonded to a lower end of each stopper bracket through a vulcanization process, and the stopper bracket is coupled at an upper end thereof to each of the rear body side frames.

3. The rear suspension structure as defined in claim 2, wherein a distance between the axle housing and each bump stopper is shorter than a distance between an inside upper end of the air chamber and an upper end of the associated piston.

4. The rear suspension structure as defined in claim 1, wherein the lower radius rod has a structure such that an overall length thereof is adjusted by varying a thickness of a shim interposed between the member bracket and the bushing pipe.

* * * * *